April 12, 1966 P. F. REIBEL ET AL 3,245,518
BELT WITH INTEGRALLY MOLDED TEETH AND VANES
Filed June 7, 1962 3 Sheets-Sheet 1
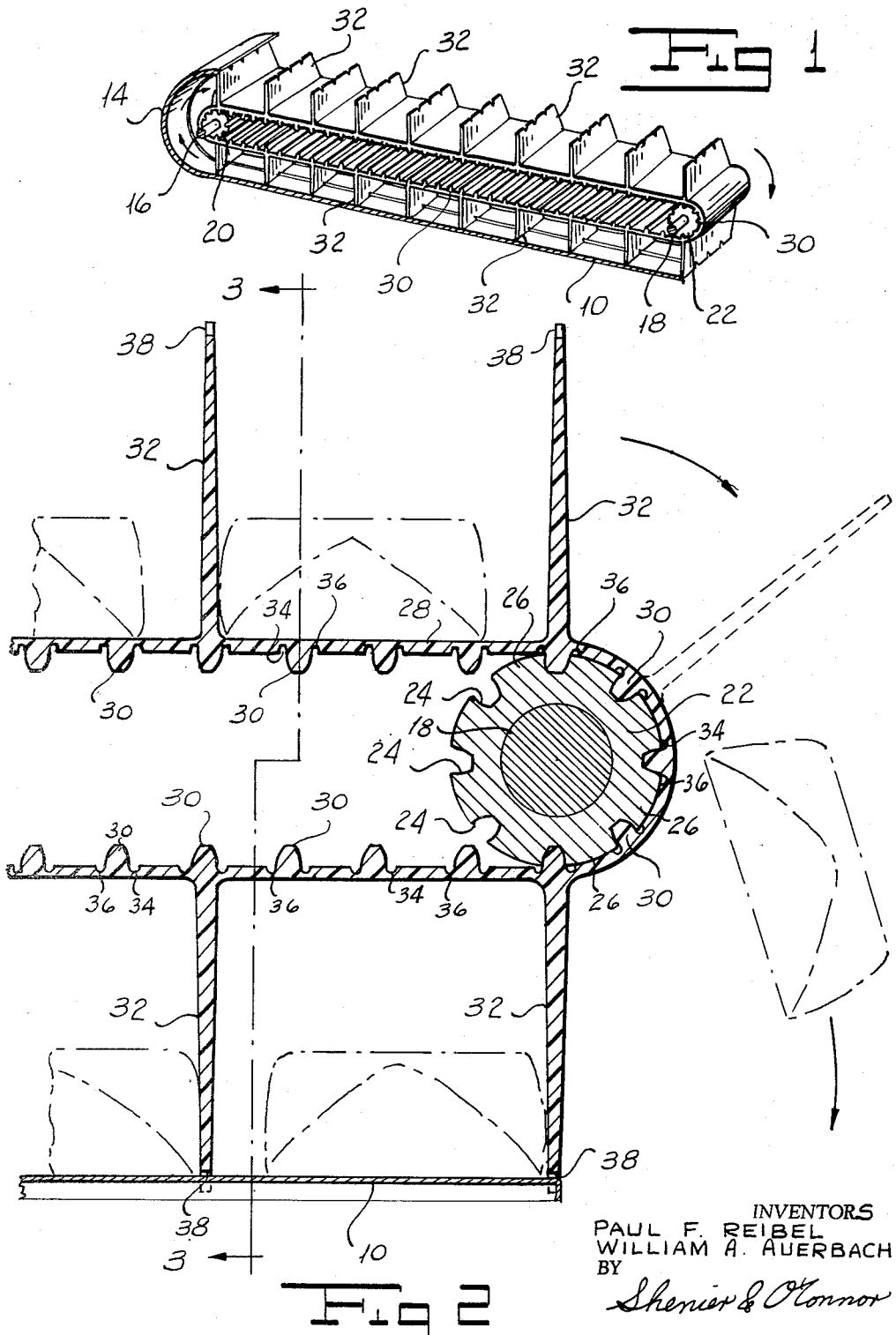
INVENTORS
PAUL F. REIBEL
WILLIAM A. AUERBACH
BY
Shenier & O'Connor
ATTORNEYS April 12, 1966 P. F. REIBEL ET AL 3,245,518
BELT WITH INTEGRALLY MOLDED TEETH AND VANES
Filed June 7, 1962 3 Sheets-Sheet 2
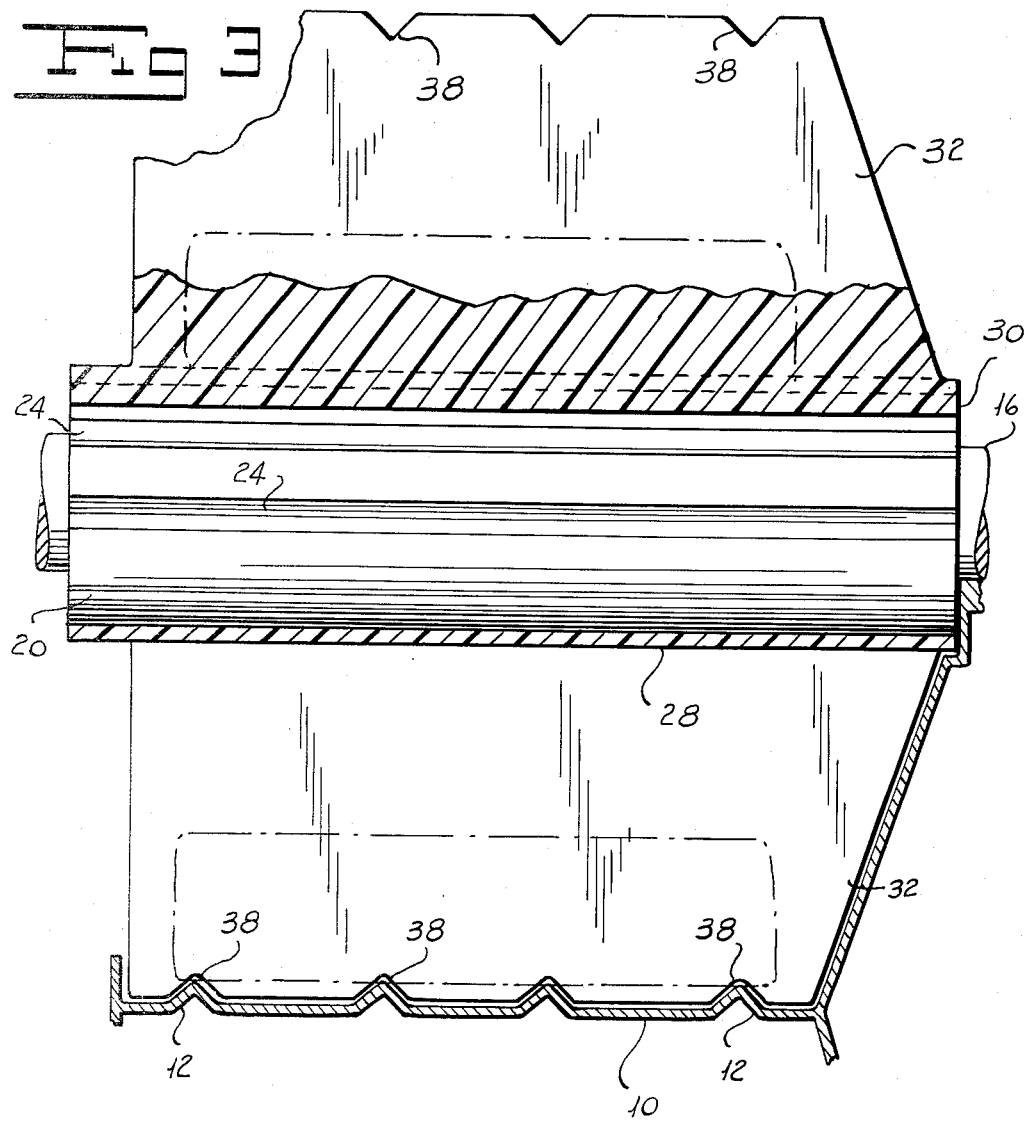
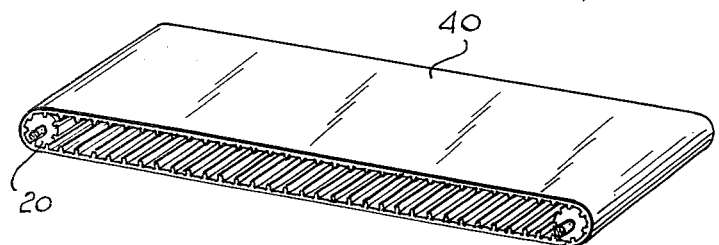
INVENTORS
PAUL F. REIBEL
WILLIAM A. AUERBACH
BY
Shenier & O'Connor
ATTORNEYS

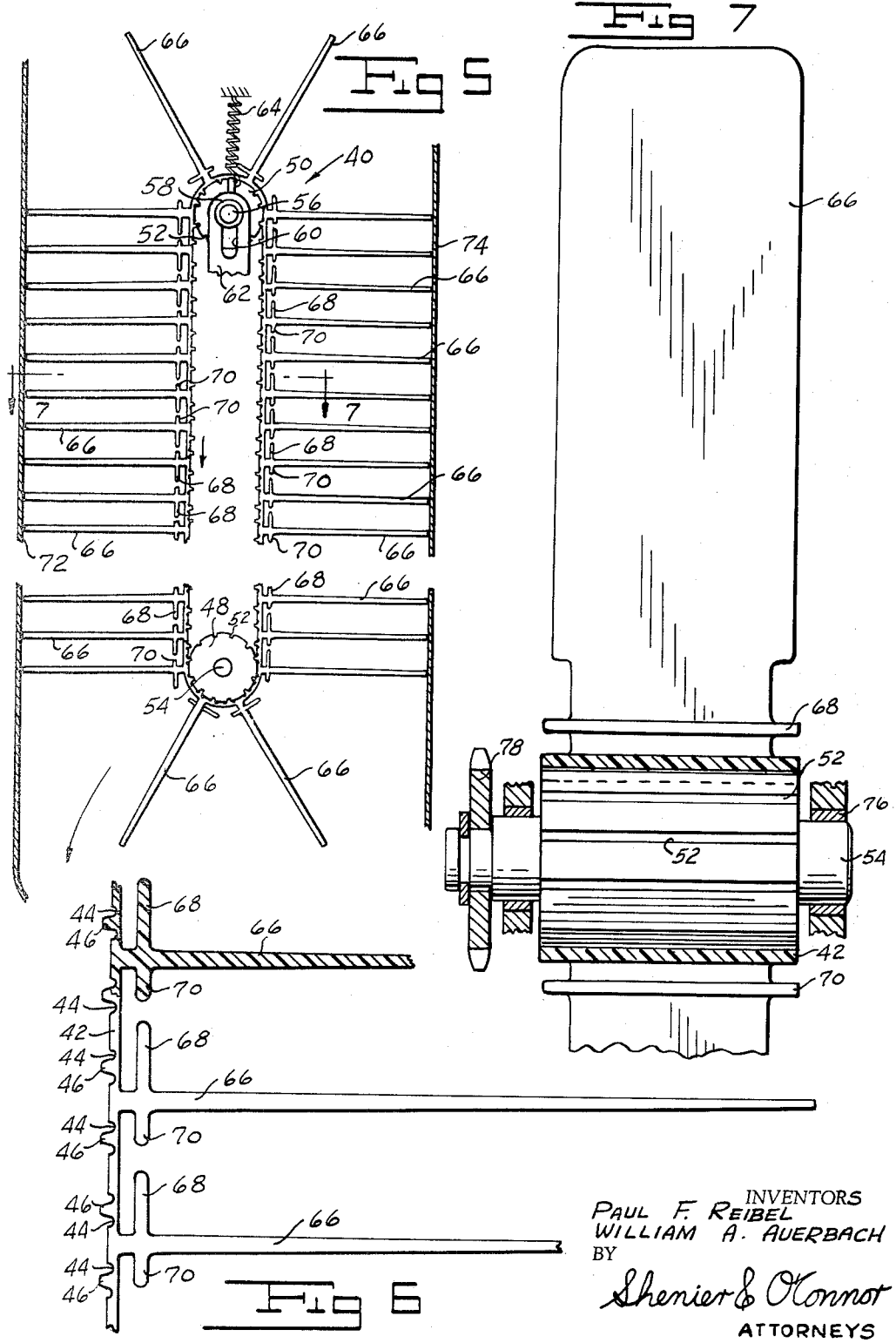

United States Patent Office 3,245,518
Patented Apr. 12, 1966

3,245,518
BELT WITH INTEGRALLY MOLDED TEETH
AND VANES
Paul F. Reibel, Pinebrook, and William A. Auerbach, Morris Township, N.J., assignors, by mesne assignments, to Automatic Canteen Company of America, Chicago, Ill., a corporation of Delaware
Filed June 7, 1962, Ser. No. 200,811
2 Claims. (Cl. 198—198)

Our invention relates to a toothed belt and more particularly to a molded plastic toothed belt especially adapted for use in a merchandising machine.

There are known in the prior art toothed belts formed of flexible material such, for example, as rubber which are driven by sprocket wheels so as to be moved through a predetermined distance for a given rotation of the wheel. In order that these belts perform their intended function of moving through a predetermined distance in response to rotary displacement of the driving wheel they must be dimensionally stable and they must be sufficiently flexible to travel around the supporting wheels without cracking.

Attempts have been made in the prior art to use belts of the general type described above in merchandising machines to advance articles of merchandise such, for example, as food toward a delivery chute. It will readily be appreciated that in a merchandising machine the most efficient use of the space inside the machine cabinet requires that the maximum portion of the space consistent with the dispensing operation be used to store articles to be sold. For this reason in a merchandise machine in which a belt is used to advance articles toward the delivery chute the belt may be provided with pushers which, in response to movement of the belt, advance articles carried by a support disposed below the belt along the support and up around a guide to the top of the belt which carries the articles to the delivery chute. Alternatively a vertical belt having carriers can be used. Stated otherwise, for efficient use of the merchandising machine cabinet space the operating parts of the article delivery mechanism should occupy the least amount of space within the cabinet. Consistent with this desideratum the sprocket wheel which drives the belt should be of a small diameter.

In order to provide a belt in the prior art which will fulfill the necessary requirements for a merchandising machine of the type described above, it has been suggested that belts of a highly flexible material be provided with upstanding pushers or carriers of a material which is sufficiently rigid to advance or support the articles. If the pushers were made of the same material as the belt they would not be rigid enough to advance the articles as required. A belt formed of a material stiff enough to advance the articles could not be trained around the small diameter driving wheel without cracking. As an alternative to the construction just described, the belt could be made from sections of relatively rigid material connected by hinge assemblies. It will be readily apparent to those skilled in the art that the construction of belts of this nature is extremely difficult and complicated and for this reason is expensive. As a matter of fact, belts of this type may be so expensive as to prohibit their use on a merchandising machine which must be sold in a competitive market.

We conceived the idea of molding a belt integrally with pushers for advancing articles in the manner described above. Having conceived this idea, extensive experiments were made in an attempt to arrive at a belt configuration which would fulfill the necessary requirements. Attempts to mold a belt which was thin enough to permit it to be trained around a small diameter wheel without cracking proved unsuccessful since the plastic material cooled too rapidly and thus did not fill the mold. We then arrived at the concept of molding a belt of a sufficient thickness to permit the plastic to fill the mold before cooling while providing relatively thin lines or areas of plastic extending across the belt on each side of every tooth to permit the belt to flex in these areas. We discovered that these relatively confined areas could be filled with plastic in the course of the molding operation without the danger of "freezing" the material.

Having arrived at a suitable design for the plastic belt, extensive experiments were conducted to determine what material, if any, would be suitable for forming the belt. Our investigation revealed the surprising and unexpected fact that polypropylene possesses a unique combination of properties which make it suitable for the formation of our belt.

We have invented an integrally molded toothed belt which is especially adapted for use in merchandising machines. Our belt can be trained around a driving roller or wheel of small diameter without cracking. Our belt includes integrally formed pushers which are sufficiently rigid to advance articles of merchandise along a support and up around a guide. Our toothed belt can be produced more rapidly and expeditiously and at less cost than are belts of the prior art carrying pushers.

One object of our invention is to provide an integrally molded toothed belt especially suited for use in a merchandising machine.

Another object of our invention is to provide an integrally molded toothed belt having pushers sufficiently rigid to advance and to support an article of merchandise.

A further object of our invention is to provide an integrally molded toothed belt adapted to be trained around a driving wheel having a small diameter without cracking.

A still further object of our invention is to provide an integrally molded toothed belt having pushers which is less expensive to produce than are belts of the prior art carrying pushers.

Other and further objects of our invention will appear from the following description.

In general our invention contemplates the provision of an integrally molded toothed belt having molded hinges formed by areas of reduced thickness forming hinges on each side of every one of a number of teeth extending across the belt at spaced locations on one side thereof and having spaced pushers extending from the other side of the belt. We mold our belt from polypropylene plastic having a unique combination of properties making it especially suitable for our belt.

In the accompanying drawings to which reference is made in the instant specification and in which like reference characters indicate like parts in the various views:

FIGURE 1 is a fragmentary perspective view of a merchandising machine provided with our toothed belt.

FIGURE 2 is a fragmentary sectional view of the delivery end of the form of our toothed belt adapted to be used in a merchandise machine.

FIGURE 3 is a fragmentary sectional view of the form of our toothed belt shown in FIGURE 2 taken along the line 3—3 of FIGURE 2.

FIGURE 4 is a perspective view of an alternate form of our toothed belt in which no pushers are provided.

FIGURE 5 is a fragmentary sectional view of an alternate form of merchandising machine provided with an alternate form of our toothed belt.

FIGURE 6 is a fragmentary elevation with parts in section of the form of belt used in the machine illustrated in FIGURE 5.

FIGURE 7 is a fragmentary sectional view of the merchandising machine illustrated in FIGURE 5 taken along the line 7—7 of FIGURE 5 and drawn on an enlarged scale.

Referring now to FIGURES 1 to 3 of the drawings, the merchandising machine (not shown) with which one form of our belt may be used includes a support 10 formed with a plurality of longitudinally extending rails 12 along which articles of merchandise are to be advanced in a direction from right to left as viewed in FIGURE 1. We form the left end of the support 10, as viewed in FIGURE 1, with a guide 14 along which the articles are to be advanced upwardly in a manner to be described.

The machine with which our belt can be used includes respective shafts 16 and 18 carrying wheels or rollers 20 and 22. We form each of the wheels 20 and 22 with axially extending grooves 24 spaced by lands 26. The form of our belt shown in FIGURES 1 to 3 of the drawings includes a body 28 molded with teeth 30 extending across the belt length on one side thereof and so spaced as to permit adjacent teeth 30 to be received in adjacent grooves at wheels 20 and 22. We mold the belt 28 with a plurality of spaced pushers 32 extending out from the surface of the belt 28 on the other side from the teeth 30.

As is pointed out hereinabove, having conceived the idea of forming a toothed belt of molded plastic, we investigated possible configurations and discovered that a plastic belt could be molded in such manner as to fill the mold and yet be permitted to flex by providing respective areas 34 and 36 of reduced thickness extending across the belt length on the sides of a tooth 30. These areas 34 and 36 form hinges to permit the portion of the belt 28 between a pair of adjacent hinges alongside two adjacent teeth 30 to flex as the belt 28 passes around the roller 22.

While we have shown an entire belt 28 molded as an integral unit in FIGURES 1 to 3 it will readily be appreciated that where a relatively long belt is to be formed it may be molded in sections with adjacent sections joined in any suitable manner. In some instances we so form the belt to avoid the expense of making extremely large molds. Preferably we form the ends of the pushers 32 and notches 38 complementary to the rails 12 in the manner shown in FIGURE 3 so as to guide the belt in the course of its movement.

Once we discovered the appropriate configuration described above for a molded plastic belt we conducted extensive experiments in an effort to determine what material would be appropriate for the formation of the belt. In the course of this work we made the surprising discovery that polypropylene has a unique combination of properties which renders it eminently suitable for the formation of our belt. It has an extremely high resistance to stress cracking. We believe that this results from a morphological change in its crystalline structure when it is stressed. This change produces an orientation of the crystals which provides an extremely high tensile strength. Consequently, the material necks down in the area of flex and upon further flexing after the initial flex the orientation increases and the hinge becomes stronger with use. The material forms a tough skin during molding or extrusion thus enhancing its resistance to stress cracking. For use in a merchandise machine for dispensing food the material has a further highly desirable property of permitting it to be raised to sterilization temperatures without distortion. In addition, it is highly resistant to abrasion. It is relatively inexpensive. It can be colored and will receive a high polish so that it can readily be cleaned.

The significance of the combination of properties possessed by polypropylene is best appreciated by considering possible alternative materials which were tried in the course of our investigation. Rubber proved to be completely unsatisfactory owing to the fact that it has insufficient rigidity to form the pushers. Experiments were made with vinyl plastic. This material, however, proved to be too flexible to permit proper formation of the pushers. It tears readily at the hinges and distorts at relatively low temperatures. Polyethylene was entirely unsuitable owing to its tendency to crack under stress and moreover it distorts at relatively low temperatures. Nylon was not an appropriate material since it is dimensionally highly unstable and moreover it is so expensive as to render its use for the belt prohibitive. Acetates not only are dimensionally unstable, but they distort when subjected to heat at sterilization temperatures. Propionate not only tears readily but moreover it is dimensionally unstable and cracks upon flexing and it is subject to heat distortion at relatively low temperatures. Butyrate proved unsatisfactory owing to its heat distortion characteristic and further it has a highly offensive odor so as to be entirely unsuitable for use in connection with the dispensing of articles of merchandise such as food. Linear polyethylene distorts at very low temperatures and is subject to stress cracking so that no satisfactory hinge can be produced by use of this material. Even those ones of the materials tried which can flex do not have a life in flexing which in any way compares with that of polypropylene which can be flexed many thousands of times without failure.

In one particular application for my belt we inject polypropylene from a nozzle at a temperature of about 470° F. into a mold maintained at a temperature of 160° F. with an injection pressure of 16,000 p.s.i. After the material has set, the belt section is removed from the mold. It is to be understood that we radius all corners and edges on the mold for proper flow of the plastic materials. In this instance the body of the belt 28 has a thickness of, for example, 0.046″ while the thickness of material in the area of the hinges 34 and 36 is reduced to about 0.010″. A belt made in this manner is capable of tracking around a wheel or roller 22 having a diameter as small as 1″. We form the pushers 32 of a thickness such that they are rigid enough to support an article being dispensed in the course of its movement around the guide 14.

Referring now to FIGURE 4 we have shown a form of our belt 40 carried by wheels or rollers such as rollers 20 and 22. This belt may be the same as the belt 28 with the exception that no pushers 32 are formed on the belt. This form of flexible belt is suitable for general application such as to perform timing operations in response to movement of the roller 22 or for any other application which requires a predetermined movement of the belt in response to a given rotation of wheel 22.

Referring now to FIGURES 5 to 7, we have shown our toothed belt in use in a machine in which articles are dispensed in a vertical direction. This form of our belt indicated generally by reference character 40 includes a body 42 formed with hinges 44 extending across the belt adjacent the belt teeth 46. Belt 40 is carried by respective drive rollers 48 and 50 each of which has grooves 52 for the reception of the teeth 46. Roller 48 is supported on a shaft 54 carried by bearings 76 and adapted to be driven by means of a sprocket wheel 78 or the like to dispense articles of merchandise. The roller 50 may be the belt tensioning roller carried by a shaft 56 supported in bearings 58 slideably mounted in slots 60 in frame members 62. Any suitable means such as springs 64 or the like may act on the bearings 58 to tension the belt 40. We form belt 40 with a plurality of article carriers 66 in a manner similar to that in which the pushers 32 are formed on the belt 28. Each carrier 66 is provided with projections 68 and 70 for supporting articles of merchandise as the belt 40 is driven to advance articles in the direction of the arrow in FIGURE 5 to a position at which they are dispensed. We provide the machine with side retainers 72 and 74 for ensuring that articles do not slide off carriers 66.

It will be seen that we have accomplished the objects of our invention. We have provided an integral molded toothed belt which is especially adapted for use on a merchandising machine. Our belt is sufficiently flexible to permit it to be trained around a small diameter sprocket while at the same time being sufficiently rigid to permit the pushers to support the weight of an article of merchandise being dispensed by the machine. Our belt is more simply and expeditiously produced than are belts of the prior art with the result that it is less expensive. Our belt can be raised to sterilization temperatures without heat distortion so that it is eminently suited for use in dispensing food.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a machine for dispensing articles of merchandise, a unitary belt comprising a molded length of polypropylene of a thickness providing functional rigidity, spaced molded teeth formed integrally with said length on one side thereof, respective areas of said polypropylene substantially thinner than said length extending across said belt immediately adjacent said teeth to provide functional flexibility in said areas and respective integrally molded members outstanding from the opposite side of said length extending substantially completely transversely across said length and being of a thickness providing functional rigidity, said members defining compartments housing articles of merchandise to be dispensed.

2. A machine as in claim 1 in which each of said members is located on said opposite side at a location corresponding to the location of a tooth.

References Cited by the Examiner

UNITED STATES PATENTS

| | | | |
|---|---|---|---|
| 516,675 | 3/1894 | Cook | 221—28 X |
| 1,453,585 | 5/1923 | Guiffre et al. | 221—78 |
| 2,939,860 | 6/1960 | Schramm. | |
| 2,941,413 | 6/1960 | Huber et al. | 154—52.2 X |
| 2,983,637 | 5/1961 | Schmidt. | |
| 3,058,863 | 10/1962 | Gaines et al. | |
| 3,068,710 | 12/1962 | Beckadolph et al. | 154—52.1 X |
| 3,077,925 | 2/1963 | Perkins et al. | 154—52.1 X |

FOREIGN PATENTS

| | | |
|---|---|---|
| 447,526 | 3/1948 | Canada. |
| 849,776 | 9/1960 | Great Britain. |

OTHER REFERENCES

"New Built-in Properties of Polypropylene Open Fresh Markets," Resin News, June, 1961, page 4. (Copy in 154—polythene digest, and Scientific Library.)

SAMUEL F. COLEMAN, *Primary Examiner.*

WILLIAM B. LABORDE, *Examiner.*